United States Patent [19]

Tokunaga

[11] Patent Number: 4,580,646
[45] Date of Patent: Apr. 8, 1986

[54] MOTOR MOUNTING APPARATUS IN A HYDROSTATICALLY DRIVEN VEHICLE

[75] Inventor: Noriyasu Tokunaga, Komatsu, Japan

[73] Assignee: Kabushiki Kaisha Komatsu Seisakusho, Japan

[21] Appl. No.: 563,341

[22] Filed: Dec. 20, 1983

[51] Int. Cl.$^4$ .............................................. B60K 17/00
[52] U.S. Cl. ................... 180/6.48; 180/9.1; 248/674; 280/781; 305/10
[58] Field of Search ............. 180/6.48, 6.24, 6.2, 180/9.1 R, 9.2, 242, 307, 312, 291; 248/200, 637, 674; 280/781; 305/10

[56] References Cited

U.S. PATENT DOCUMENTS

| | | | |
|---|---|---|---|
| 1,223,333 | 4/1917 | Freeman | 180/312 X |
| 3,645,350 | 2/1972 | Deu et al. | 180/9.1 |
| 3,893,531 | 7/1975 | Gee | 180/6.48 |
| 4,116,292 | 9/1978 | Todeschini et al. | 180/6.48 |

FOREIGN PATENT DOCUMENTS 120780 11/1918 United Kingdom ................ 180/312

*Primary Examiner*—John A. Pekar
*Assistant Examiner*—Mitchell J. Hill
*Attorney, Agent, or Firm*—Armstrong, Nikaido, Marmelstein & Kubovcik

[57] ABSTRACT

A motor mounting apparatus in a hydrostatically driven vehicle including a hydraulic pump and a hydraulic motor. The mounting apparatus includes a mounting plate fixedly secured to the motor. The mounting plate has an upwardly extending section and a downwardly extending section. The upwardly extending section is mounted to brackets with bolts and which brackets are in turn mounted to the outer surface of a vehicle frame with bolts. A final drive casing is detachably mounted to the outer surface of the frame and the downwardly extending section of the mounting plate is mounted to the final drive casing via the frame.

3 Claims, 3 Drawing Figures

MOTOR MOUNTING APPARATUS IN A HYDROSTATICALLY DRIVEN VEHICLE

BACKGROUND OF THE INVENTION

This invention relates to an improved apparatus for mounting running motors for a hydrostatically driven vehicle.

There have so far been employed two methods for mounting running motors; that is, one is to mount a running motor on the inside of a reduction gear casing fitted to the vehicle body frame by means of bolts or to mount the running motor on the inside of the vehicle body frame by bolts independently of the reduction gear casing fitted to the outside thereof. The former method, however, has been disadvantageous in that, if the final reduction gear casing is disconnected from the running gear to remove the casing from the vehicle body frame, then the running motor drops by its dead load and therefore a measure for holding the running motor must be taken thus causing a difficulty and inconvenience upon making maintenance and repairs. Whilst, the latter method has also been disadvantageous in that it is required to make fine finishing of the inside and outside surfaces of the vehicle body frame in order to obtain an accuracy for fitting thus requiring much labor for working.

SUMMARY OF THE INVENTION

It is therefore an object of the present invention to provide a motor mounting apparatus in a hydrostatically driven vehicle which diminishes the above noted problems of the prior art.

Another object of the present invention is to provide a motor mounting apparatus in a hydrostatically driven vehicle which can provide an easy mounting and dismounting of a motor.

In accordance with the present invention, there is provided a motor mounting apparatus in a hydrostatically driven vehicle including a hydraulic pump and a hydraulic motor connected with the hydraulic pump in a closed loop and driven thereby, said motor mounting apparatus comprising: a frame of the vehicle, said frame having inside and outside surfaces; a mounting plate fixedly secured to said motor, said mounting plate having an upwardly extending section and a downwardly extending section; means for mounting the upwardly extending section of said mounting plate inwardly to said frame; a final drive casing detachably mounted outwardly to said frame; and means for mounting the downwardly extending section of said mounting plate to said final drive casing via said frame.

The above and other objects, features and advantages of the present invention will be readily apparent from the following description taken in conjunction with the accompanying drawings.

DESCRIPTION OF THE PREFERRED EMBODIMENT

Figure 1:
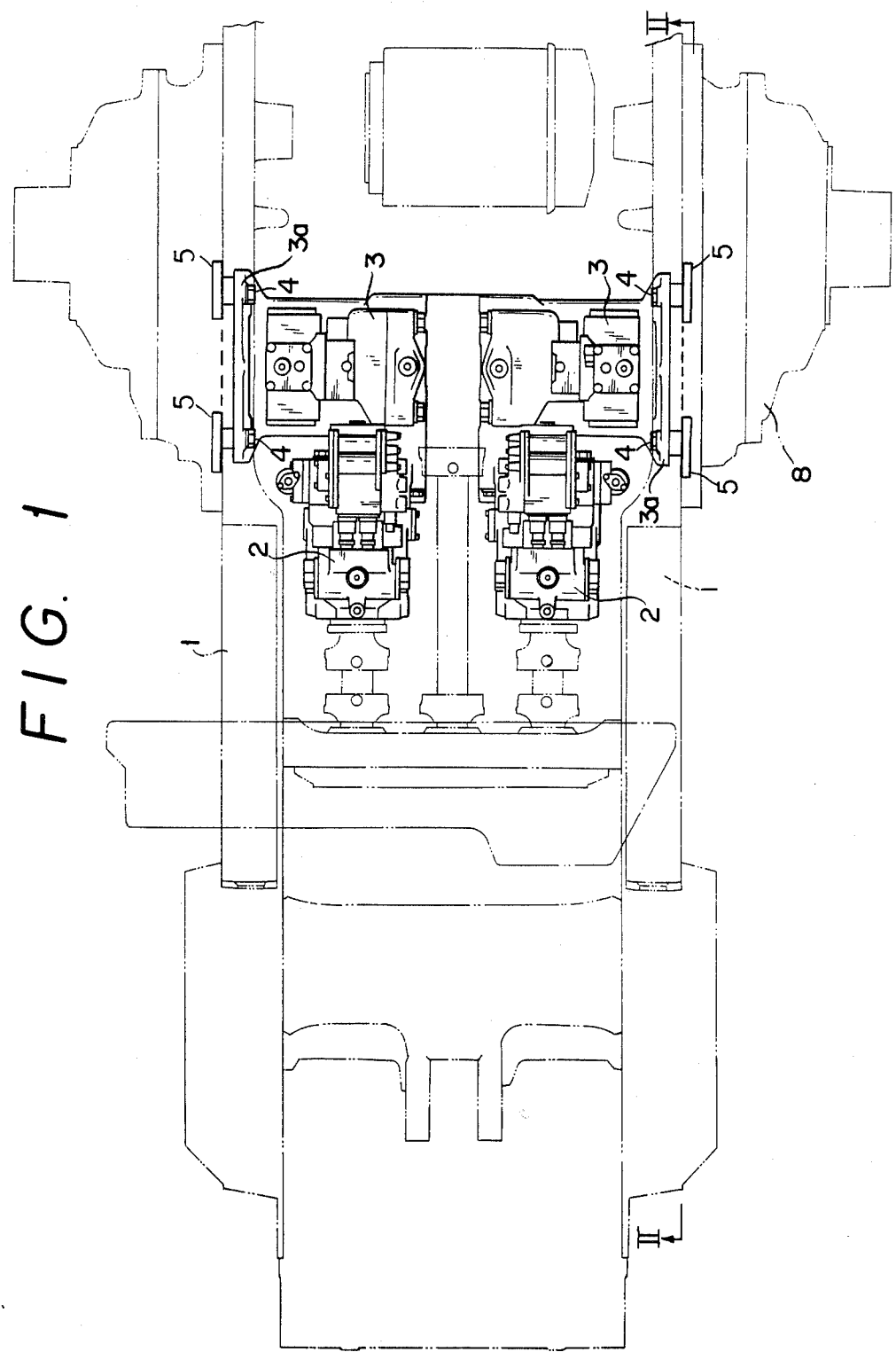
FIG. 1 is a top plan view of a motor mounting apparatus according to the present invention.
Figure 2:
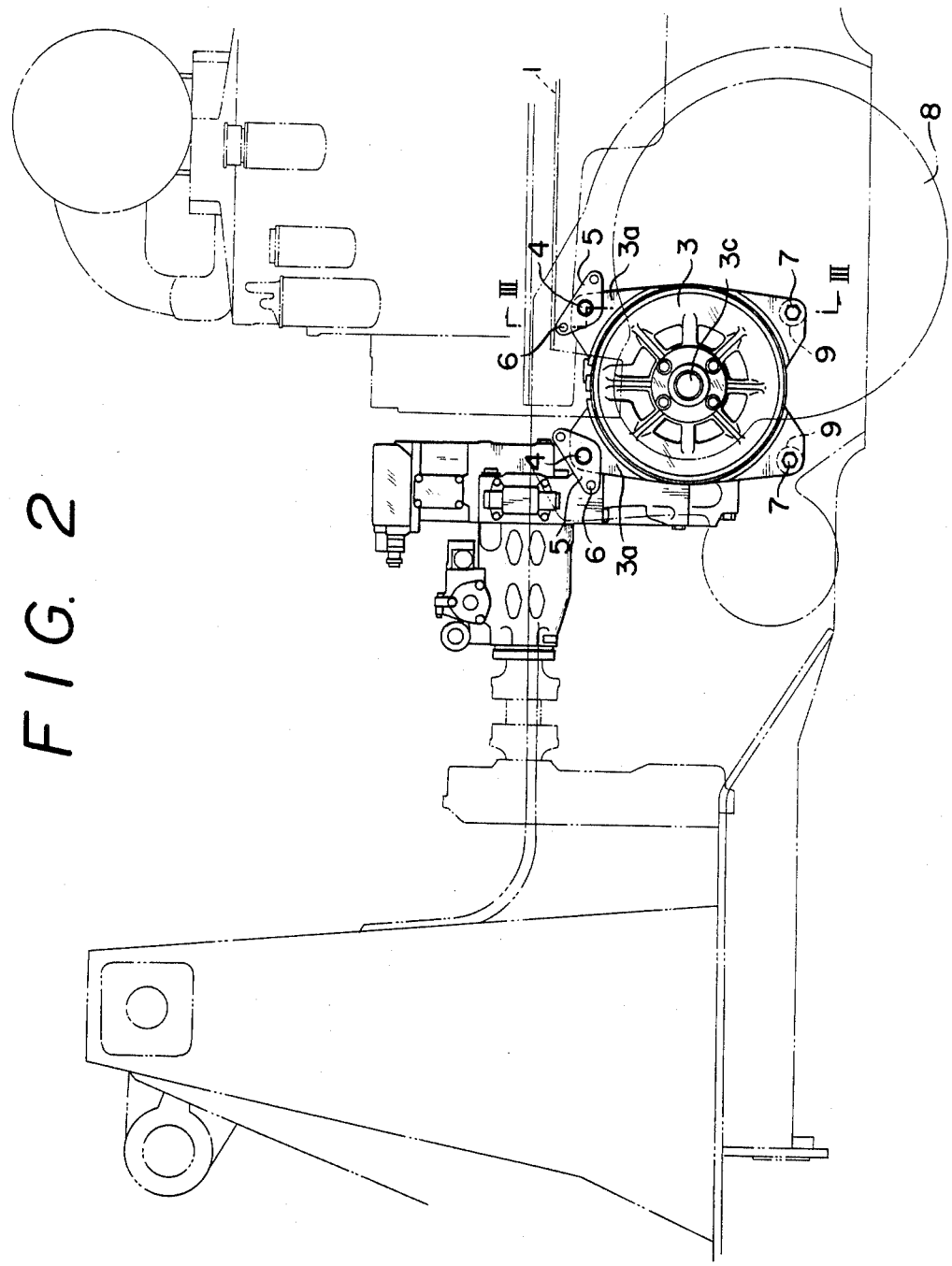
FIG. 2 is a side elevational view taken along the line II—II of FIG. 1.
Figure 3:
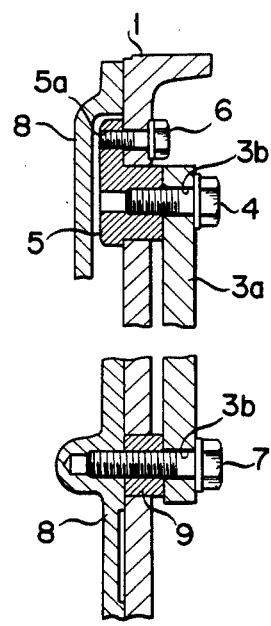
FIG. 3 is a cross-sectional view taken along the line III—III of FIG. 2.

The present invention will now be described in detail below by way of example only with reference to the accompanying drawings. In the drawings, reference numeral 1 denotes the body frame of a hydrostatically driven vehicle having two sets of independent hydraulic pumps 2, 2 mounted on the left and right sides thereof. Disposed behind the hydraulic pumps 2, 2 are two sets of hydraulic motors 3, 3 arranged to be driven by the fluid under pressure discharged from the pumps. Each of the hydraulic motors 3, 3 has a projecting, integrally formed mounting plate 3a on the side opposite to the inside surface of the vehicle body frame 1. The mounting plate 3a has bolt holes 3b formed in its corners. A bolt 4 is inserted through each of the two holes 3b so that the mounting plate 3a may be fixedly secured to triangular brackets 5 fitted to the side face of the vehicle body frame by the bolts 4. These brackets 5 each have a screw threaded hole 5a formed in the end thereof. Threadably engaged with the screw threaded holes 5a are the leading ends of mounting bolts 6 inserted from the inside of the vehicle body frame 1 for fixedly securing the brackets 5 on the outside surface of the vehicle body frame 1. The upper part of the mounting plate 3a of the hydraulic motor 3 is fitted to the vehicle body frame 1 by the brackets 5, whilst the lower part of the mounting plate 3a is fitted through spacers 9 to a final reduction gear casing 8 by means of mounting bolts 7 inserted into bolt holes 3b.

Whilst, mounted by bolts, not shown, to the outside of the vehicle body frame 1 are final reduction gear casings 8 each enclosing a final reduction gear having an input shaft, not shown, connected to an output shaft 3c of each hydraulic motor 3.

Since the present invention is constructed as mentioned above, in case of removing the final reduction gear casing 8 from the vehicle body frame 1, the casing 8 can be removed independently of the hydraulic motor 3 only by removing mounting bolts, not shown, and the bolts 7 inserted in the corners of the lower part of the mounting plate 3a, and also there is no possibility of dropping of the hydraulic motors 3 when removing the final reduction gear casings 8 so that the need for holding the hydraulic motors 3 can be eliminated thus enabling maintenance and repairs to be made easily. Further, since the arrangement is made such that the hydraulic motors 3, 3 are fitted to the vehicle body frame 1 through the brackets 5 which are previously fitted to the vehicle body frame 1, the hydraulic motors 3 can be mounted easily, and also since the brackets 5 are mounted on the side of the final reduction gears, it is only necessary to conduct finishing work of the outside fitting surface of the vehicle body frame, thus reducing the number of manufacturing steps as compared with that in the conventional method wherein the inside and outside surfaces of the body frame 1 are need to be finished.

It is to be understood that the foregoing description is merely illustrative of a preferred embodiment of the invention, and that the invention is not to be limited thereto, but is to be determined by the scope of the appended claims.

What is claimed is:

1. In a hydrostatically driven vehicle including a hydraulic pump and a hydraulic motor connected to said hydraulic pump in a closed loop and driven thereby, a motor mounting apparatus for said motor comprising:
- a vehicle frame having an inside surface and an outside surface;
- a mounting plate fixedly secured to said motor, said mounting plate having an upwardly extending section and a downwardly extending section;
- means for mounting the upwardly extending section of said mounting plate inside of said frame;
- a final drive casing detachably mounted outside of said frame; and
- means for mounting said downwardly extending section of said mounting plate to said final drive casing through said frame.

2. In an apparatus according to claim 1 wherein said means for mounting the upwardly extending section comprises a bracket, a first bolt means mounting said bracket on said outside surface of said frame, and second bolt means mounting said upwardly extending section of said mounting plate on said bracket.

3. In an apparatus according to claim 2 wherein said means for mounting the downwardly extending section comprises third bolt means and a spacer sandwiched between said mounting plate and said final drive casing.

* * * * *